United States Patent [19]

Smith et al.

[11] 3,912,589

[45] Oct. 14, 1975

[54] PREPARATION OF CEPHALOSPORIN COMPOUNDS

[75] Inventors: Alan Smith, Ulverston, England; Stephen Arthur Goulden, Orinda, Calif.

[73] Assignee: Glaxo Laboratories Limited, Greenford, England

[22] Filed: May 10, 1974

[21] Appl. No.: 468,647

[52] U.S. Cl. .................................. 195/29; 195/30
[51] Int. Cl.² ...................................... C12D 13/02
[58] Field of Search ............................ 195/30, 29

[56] References Cited
UNITED STATES PATENTS 3,304,236    2/1967    Nuesch et al. .................... 195/29

Primary Examiner—Alvin E. Tanenholtz
Attorney, Agent, or Firm—Bacon & Thomas

[57] ABSTRACT

3-Acyloxymethylceph-3-em-4-carboxylic acids, for example cephalosporin C, are enzymically deacylated to their 3-hydroxymethyl analogues by means of esterases produced by culturing a yeast microorganism or a mutant thereof of the genus *Rhodotorula*, for example a microorganism of the species *Rhodotorula rubra*.

13 Claims, No Drawings

PREPARATION OF CEPHALOSPORIN COMPOUNDS

This invention relates to the transformation of cephalosporin compounds, and is particularly concerned with enzymically catalysed hydrolysis of 3-acyloxymethyl cephalosporins.

The cephalosporin compounds referred to in this specification are generally named with reference to "cepham" (J. Am. Chem. Soc. 1962, 84, 3400). The term "cepham" refers to the cepham structure with one double bond.

3-Hydroxymethyl cephalosporin compounds are valuable intermediates in the synthesis of a range of cephalosporin antibiotics possessing substituted methyl groups at the 3-position by virture of the chemical reactivity of the hydroxyl group and the consequent ease with which the hydroxymethyl group may be converted to a desired 3-(substituted methyl) group, Furthermore, 7-acylamido-3-hydroxymethylceph-3-em-4-carboxylic acids possess antibiotic properties. The preparation of 3-hydroxymethyl cephalosporin compounds by hydrolysis of 3-acyloxymethyl cephalosporins, in particular naturally-occurring fermentation-produced 3-acetoxymethyl cephalosporin compounds such as cephalosporin C [(6R,7R)-3-acetoxymethyl-7-(D-5-amino-5-carboxypentanamido)ceph-3-em-4-carboxylic acid] and derivatives thereof, e.g. N-protected derivatives and compounds in which the D-5-amino-5-carboxypentanoyl group has been otherwise transformed or has been removed and if desired replaced by another acyl group, is accordingly of considerable interest.

Hydrolysis of 3-acyloxymethylceph-3-em-4-4-carboxylic acids to their 3-hydroxymethyl analogues by chemical methods has proved to be generally impractical, since such reactions are accompanied by rapid and substantially irreversible lactonisation involving reaction of the 3-hydroxymethyl and 4-carboxy groups and/or by destruction of the β-lactam ring system.

It has been found possible, however, to hydrolyse 3-acyloxymethylceph-3-em-4-carboxylic acids by enzymically catalyzed methods under conditions where lactonisation and β-lactam degradation may be substantially or completely obviated. While esterases derived from a range of sources, e.g. plant sources, may be employed in these enzymatically catalysed methods, practical difficulties may be encountered in the isolation of sufficient quantities of esterase from some of the sources; esterases obtained from microorganisms are accordingly the most convenient in practice in view of the comparitive ease with which microorganisms may be cultivated on a large scale using standard fermentation techniques to afford a ready supply of the esterase.

The present invention is based on our discovery that esterases obtained from yeast microorganisms of the genus Rhodotorula and mutants thereof advantageously promote hydrolysis of 3-acyloxymethylceph-3-em-4-carboxylic acids to their 3-hydroxymethyl analogues and possess substantial advantages over previously proposed microorganism-produced esterases.

According to one aspect of the present invention, therefore, we provide a process for the conversion of a 3-acyloxymethylceph-3-em-4-carboxylic acid to a 3-hydroxymethyl analogue thereof by hydrolysis characterised in that the hydrolysis is catalysed by an esterase produced by culturing a yeast microorganism or a mutant thereof of the genus Rhodotorula.

3-Acyloxymethylceph-3-em-4-carboxylic acids which may be hydrolysed in accordance with the invention include compounds represented by the general formula

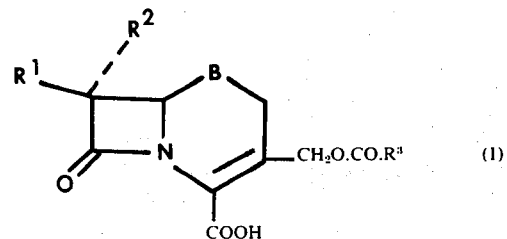

wherein $R^1$ is an amino or blocked amino group, for example a $C_{1-20}$ carboxylic acylamido group; $R^2$ is hydrogen or a lower alkyl, lower alkoxy, lower alkylthio or lower alkanoyl group (the term "lower" as used herein designating groups containing not more than 8, preferably not more than 6 carbon atoms); $R^3.CO$ is a $C_{2-20}$ carboxylic acyl group; and B is >S or >S → O (α– or β–).

Acylamido groups $R^1$ which may be present in the compounds of formula I include the D-5-amino-5-carboxypentanamido group found in naturally-occurring fermentation-produced compounds such as cephalosporin C; N-protected dervitives of the D-5-amino-5-carboxypentamido group, e.g. wherein the amino group is substituted by a protecting group of the type described in any of British Pat. specification Nos. 1,041,985; 1,302,015 or 1,313,207, for example a lower alkyl group, or aryl lower alkyl group, an aryl group (e.g. 2,4-dinitrophenyl) or an acyl group, particularly a lower alkanoyl group (e.g. acetyl, propionyl or butyryl), an α-halo-or α,α-dihalo- lower alkanoyl group (e.g. chloroacetyl or dichloroacetyl), an aroyl group (e.g. benzoyl, chlorobenzoyl, nitrobenzoyl or tosyl), a lower alkoxycarbonyl group (e.g. t-butoxycarbonyl), an aryl lower alkoxycarbonyl group (e.g. benzyloxycarbonyl) or a di-acyl group such as phthaloyl; an acylamido group obtained by transformation of the D-5-amino-5-carboxypentanamido group, e.g. a 4-carboxybutamido group obtained therefrom by, for example, enzymic oxidation; formamido; a group of formula

$$R(CH_2)_n.CONH-$$

where R is a carbocyclic or heterocyclic aryl group (e.g. phenyl; phenyl substituted by one or more of halo, hydroxy, lower alkyl, nitro, amino, lower alkanoyl, lower alkoxy or lower alkylthio; thienyl or furyl) or an aryloxy, arylthio, aryl lower alkoxy or aryl lower alkylthio group (e.g. phenoxy, phenylthio, 5-methyl-1,3,4-thiadiazol-2-ylthio or benzylthio) and n is an integer of from 1 to 4; a group of formula

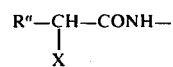

$$R''—\underset{X}{CH}—CONH—$$

where R" is an aryl group (e.g. a monocyclic or bicyclic carbocyclic aryl group such as phenyl, naphthyl, or phenyl substituted by one or more of halo, hydroxy, lower alkyl, nitro, amino, lower alkanoyl, lower alkoxy or lower alkylthio) and X is amino, protected amino (e.g. containing any of the N-protecting groups discussed above in connection with the D-5-amino-5-carboxypentanamido group, for example a t-butoxycarbonyl group), carboxy, carbalkoxy or hydroxy; and a group of formula

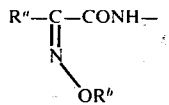

where R" has the above-defined meaning (e.g. where R" is phenyl, substituted phenyl, naphthyl, thienyl, furyl or pyridyl) and R" is hydrogen, acyl (e.g. lower alkanoyl), lower alkyl (e.g. methyl, ethyl, propyl or butyl), cycloalkyl (e.g. containing 5-7 carbon atoms, such as cyclopentyl or cyclohexyl), aryl (e.g. carbocyclic aryl such as phenyl) or aryl lower alkyl (e.g. benzyl or phenethyl). Examples of $R^1$ groups falling within the above general formulae which may be present in compounds of formula I include phenylacetamido, thienylacetamido, 2-hydroxy-2-phenylacetamido, 2-t-butoxycarbonylamino-2-phenylacetamido and syn-2-furyl-2-methoxyiminoacetamido.

Acyl groups $R^3.CO$ which may be present in compounds of formula I include a range of aliphatic, araliphatic and aromatic groups, for example lower alkanoyl groups such as acetyl, propionyl and butyryl; lower alkenoyl, groups such as crotonyl; aryl lower alkanoyl groups such as phenylacetyl; and aroyl groups such as benzoyl. As indicated above, the process of the invention finds particular application in the hydrolysis of cephalosporin C and derivatives thereof, i.e. compounds of formula I wherein $R^3$. CO is an acetyl group.

The groups $R^2$ and B in formula I preferably represent hydrogen and >S respectively.

The yeast microorganism from which the esterase is obtained may conveniently be preserved by freeze drying in a suspension of 2% whey in sealed glass ampoules. The freeze dried culture may be reconstituted by the addition of sterile water. The resuspended organisms can be cultured by, for example, streaking onto a solid nutrient medium, e.g. an aqueous medium containing 2% glucose, 1% yeast extract, 1% peptone and 0.5% potassium dihydrogen phosphate, solidified with 2% agar (all percentages being w/v), at a pH of 5.6. The surface cultures are grown, e.g. at 25°C, until the agar is covered and may then be preserved for several months at low temperature e.g. 5°C. The organism may be grown in submerged culture, conveniently at 25°C, by, for example, inoculating a liquid nutrient medium with a sample of the surface culture; and example of a suitable nutrient medium for this purpose is that described above for surface culture without agar. It is often convenient to maintain a liquid culture of the organism which can be used to inoculate subsequent liquid cultures, e.g. production scale cultures, since this avoids the tedium of many surface to liquid inoculations and allows a larger inoculum to be used. The yeast suspension obtained after incubation of such a subsequent liquid culture for an appropriate time, e.g. about 3 days, conveniently at 25°C, may then be used as a source of the esterase employed to deacylate the 3-acyloxymethylceph-3-em-4-carboxylic acid starting material.

Formation of the esterase may in certain instances be enhanced by addition of an inducer to the liquid culture medium. Suitable inducers include cephalosporin C, cephalothin [(6R,7R)-3-acetoxymethyl-7-(thien-2-yl) acetamidoceph-3-em-4-carboxylic acid] and their salts (e.g. alkali metal salts such as the potassium salt), inducers such as potassium cephalosporin C having been found effective in amounts of less than 0.1% w/v. The inducer is conveniently added to the liquid culture medium after sterilisation. The inducer may be sterilised by passage through a sterile filter, while the culture medium may be sterilised by, for example, autoclaving at about 121°C and 10,500 kg/m², e.g. for 15 minutes.

The esterase may be employed in several different forms to hydrolyse the 3-acyloxymethylceph-3-em-4-carboxylic acid starting material. Thus, for example, a sample of the liquid cultured medium may itself be employed as the source of esterase, if desired after rupture of the yeast cells, for example by conventional methods such as ultrasonic treatment or treatment with lytic enzymes. An aqueous extract of the suspension resulting from such rupture of the cells may similarly be used. Alternatively, whole cells filtered off from the liquid cultured medium may be employed, as may the corresponding filtrate; where it is desired to use the filtrate the cells may again be ruptured, e.g. as described above, prior to filtration.

The use of whole cells is of particular advantage in that these may readily be separated, for example as a cell suspension, from the liquid cultured medium, are easily preserved, e.g. as a dried or deep frozen paste which may be added directly to the hydrolysis reaction mixture, and are easily removable, e.g. by filtration, from the reaction mixture after the hydrolysis has terminated. The cells thus separated may be reused, e.g. after washing with water, to hydrolyse further samples of the 3-acyloxymethylceph-3-em-4-carboxylic acid starting material. We have found that sufficient esterase activity to give a hydrolysed cephalosporin product of satisfactory quality in consistent yield may be retained throughout as many as seven recyclings of the cells, rendering this embodiment of the process of substantial economic advantage.

If desired, the whole cells may be immobilized in or on an inert matrix (e.g. a polymer or a membrane), for example by covalent binding to an inorganic or organic polymer or by entrapment in or on a fibre (e.g. cellulose triacetate) or in an envelope such as a bead, prior to their addition to a hydrolysis reaction system, in order to protect the cells and minimise losses during their recycling. One preferred matrix for use in immobilization of the cells is polyacrylamide gel.

The esterase may also be employed in cell-free form, for example obtained by precipitation from a filtrate or cellular extract derived from the liquid cultured medium as hereinbefore described, using a suitable protein precipitant, for example a salt or a solvent. The precipitated cell-free esterase may, for example be added directly to a hydrolysis reaction system or may be dissolved in water and added as an aqueous solution.

Alternatively the esterase may be employed in immobilized form, e.g. by insolubilisation or entrapment, on or in an inert matrix, suitable immobilized forms including those described in Britsh Pat. No. 1,224,947 and Belgian Pat. No. 782,646. Thus, for example, an esterase obtained from an extract of the liquid cultured medium or from redissolution of precipitated esterase may be covalently bound to an otherwise inert organic or organic polymer, entrapped on or in a fibre (e.g. a fibrous polymer such as cellulose triacetate), or on or in a membrane or a polymer such as polyacrylamide gel, absorbed on an ion-exchange resin, or occluded in an envelope such as a bead. Immobilized esterases of these types may advantageously be employed in batch processes wherein the esterase is to be reused and in the hydrolysis of a continuous flow of 3-acyloxymethylceph-3-em-4-carboxylic acid by, for example, passage through a column containing the immobilized esterase.

The hydrolysis reaction is conveniently initiated by contacting the esterase with an aqueous medium containing the 3-acyloxymethylceph-3-em-4-carboxylic acid or a salt (e.g. an alkali metal salt such as the sodium or potassium salt) thereof, the medium conveniently containing 0.5 – 10% w/v of the cephalosporin compound. The medium may if desired be sterilised prior to the hydrolysis, but we have found that the reaction does not require sterile conditions to be maintained and accordingly the hydrolysis may with advantage be carried out under non-sterile conditions.

Where the 3-acyloxymethylceph-3-em-4-carboxylic acid is a fermentation-produced cephalosporin, as in the case of cephalosporin C, the fermentation broth obtained from culture of the cephalosporin-producing organism (e.g. an organism of the genus Cephalosporium such as *Cephalosporium acremonium* Brotzu) may itself be treated with the esterase, obviating the need for an intermediate separation of the cephalosporin compound. Mycelium may if desired be removed from the broth before treatment, but in many instances it will be more convenient to employ the whole broth directly.

In general the hydrolysis is advantageously carried out at a pH between 4 and 8. The pH may be maintained throughout the reaction by the use of buffer, e.g. phosphate buffer, for example to pH 6.0. The hydrolysis is conveniently effected at ambient temperature, i.e. about 25°C. advantageously with stirring and/or aeration of the reaction mixture.

The amount of esterase or esterase-containing material required in a given reaction may readily be assessed by preliminary small-scale trial runs since the process has been found to scale up well.

The time taken to effect complete deacylation of the 3-acyloxymethylceph-3-em-4-carboxylic acid will depend on the nature of the starting material and esterase and on the reaction conditions employed, but will typically be not more than 70 hours. The course of the reaction may conveniently be followed by separating the product by thin-layer or paper chromatography using an appropriate support/solvent system combination and assaying densitometrically.

Where the 3-acyloxymethylceph-3-em-4-carboxylic acid starting material possesses a D-5-amino-5-carboxypentanamido group at the 7-position, as in the case of cephalosporin C, the hydrolytic deacylation process of the invention may be combined with enzyme catalysed oxidative deamination of the 7-position grouping, for example to a 4-carboxybutanamido grouping by treatment with a fungal oxidase, especially an oxidase derived from the yeast *Trigonopsis variabilis* as described in British Pat. No. 1,272,769 and Belgian Pat. No. 782,393. The enzymic transformation of the 3- and 7-position groupings may be effected either sequentially or concurrently.

The method used to isolate the 3-hydroxymethylceph-3-em-4-carboxylic acid product will depend on the nature of the product and the reaction system, but will in general employ conventional techniques. Thus, for example, if whole cells are used as the source of esterase these may be removed (and if desired recycled) by filtration or centrifugation and the solution further clarified by filtration, e.g. through a bed of kieselguhr. Where the 3-hydroxymethylceph-3-em-4-carboxylic acid is desacetyl cephalosporin C this may be isolated, by for example, desalting the solution by adsorption onto carbon followed by elution with acetone and water, further purifying the eluate by absorption onto an anion-exchange resin (for example Amberlite IRA-68 in the acetate form), eluting the desacetyl cephalosporin from the resin with potassium acetate solution and precipitating the product with acetone. Other techniques which may be employed in the isolation of different cephalosporin products include solvent extraction, acid precipitation, and precipitation at the isoelectric point (in the case of zwitterionic products such as (6R,7R)-7-amino-3-hydroxymethylceph-3-em-4-carboxylic acid).

In addition to the above-described advantages and practical convenience which may accompany the use of whole cells as a source of esterase in one embodiment of the present process, the process of the invention is generally convenient by virtue of the ease with which microorganisms of the genus Rhodotorula may be cultured to provide a source of the esterase, the reproducability of the hydrolysis reaction using the Rhodotorula-derived esterase and the ease with which the amount of esterase required may be assessed.

Whilst various species within the genus Rhodotorula have been found to be effective we prefer to employ organisms of the species *Rhodotorula rubra*, *Rhodotorula glutinis*, *Rhodotorula glutinis var. dairenensis* and *Rhodotorula graminis* in view of the particularly efficient hydrolysis of 3-acyloxymethylceph-3-em-4-carboxylic acids which is promoted by the esterases produced by these organaisms. The process is conveniently carried out using type species cultures of these organisms (obtained from the Centraalbureau voor Schimmelcultures, Baarn, Delft, Netherlands), i.e. using the strains *Rhodotorula rubra* CBS 17, *Rhodotorula glutinis* CBS 20, *Rhodotorula glutinis var. dairenesis* CBS 4406 and Rhodotorula graminis CBS 2826.

A further strain of *Rhodotorula rubra* which has proved particularly effective in the present process is that deposited in the Centraalbureau voor Schimmelcultures under the number CBS 6469. This strain has the following characteristics:

After 24 and 72 hours growth on malt-yeast-glucose-peptone liquid medium the cells were short and oval, $2-4.5\mu \times 2.5-5.5\mu$, occurring singly or in pairs. After one month's growth there was a non-flocculent deposit, no film or ring of cells at the surface of the liquid and very slight growth climbing the tube wall.

After 72 hours growth on malt-yeast-glucose-peptone agar cells were spherical to oval, $2-5\mu \times 2.5-7\mu$, occurring singly or in pairs. After one month a streak culture showed bright pink, very shiny and very smooth cells.

There was no pseudomycelial development after 4 weeks on slide cultures using potato dextrose agar or corn meal agar and no spore formation after 3 or 4½ weeks on carrot, sodium acetate agar or Gorodkowa's agar.

After 3 weeks, no gas formation was observed by the Durham-tube method during sugar fermentation using dextrose, fructose, galactose, maltose, sucrose, lactose, melibiose, raffinose, trehalose or soluble starch.

Growth was observed after 1, 2 and 3 weeks in liquid medium using the following as the sole source of carbon: glucose, galactose, sucrose, maltose, L-sorbose (latent growth appearing after 2 weeks), cellobiose, trehalose. raffinose, melezitose, D-xylose, L-arabinose, D-arabinose, D-ribose, L-rhamnose (latent growth appearing after 1 week), ethanol, glycerol, succinic acid, adonitol, D-mannitol, D-sorbitol and salicin. No growth was observed under the same conditions using lactose, melibiose, soluble starch, inulin, lactic acid, erythritol, dulcitol, α-methyl glucoside and inositol.

Growth was observed after 1, 2 and 3 weeks in liquid medium using ammonium sulphate and ethylamine hydrochloride as the sole nitrogen source but there was no nitrate assimilation.

Tests for hydrolysis of fat and starch production proved negative; splitting of arbutin was positive. There was no growth in a 60% osmotic pressure medium and very slight growth only after 16 days in a vitamin free liquid medium. There was growth in the presence of 100 ppm. of actidione in liquid medium.

Using Gorodkowa's medium containing chalk there was no clarification of the medium during growth of the organism, indicating no acid production.

This strain was used in Examples 1 to 11 and 14 to 16.

Type species cultures of the species of the genus Rhodotorula used in Examples 12 and 13 were obtained from the Cantraalbureau voor Shimmelcultures.

The following Examples are now given by way of illustration only. All temperatures are in °C.

EXAMPLE 1

Preparation of (6R,7R)-7-(D-5-amino-5-carboxypentanamido)-3-hydroxymethylceph-3-em-4-carboxylic acid Potassium (6R,7R)-3-acetoxymethyl-7-(D-5-amino-5-carboxypentanamido)ceph-3-em-4-carboxylate (500 g, approximately 70% pure) was dissolved in water and sterilised by passage through a sterile asbestos pad. The solution was added to 2 liters of sterile phosphate buffer (400 mM, pH 6) in a 10 liter bottle, to which was then added approximately 2 liters of a suspension of Rhodotorula rubra grown for 3 days on nutrient medium supplemented with 1% w/v (6R,7R)-3-acetoxymethyl-7-(D-5-amino-5-carboxypentanamido)ceph-3-em-4-carboxylic acid. The final volume was approx. 8 liiters and the mixture was stirred using a magnetic stirrer and aerated by sparging with sterile air at 2 liters per minute.

It was shown chromatographically that after 60 hours incubation at ambient temperature, more than 90% of the cephalosporin was present as (6R, 7R)-7-(D-5-amino-5-carboxypentanamido)-3-hydroxymethylceph-3-em-4-carboxylic acid. The broth was clarified by centrifugation and the pH adjusted to 4.5 prior to loading on to a column packed with carbon. After loading, the carbon was washed with chilled mineralised water (4 bed volumes) and eluted with 40% aqueous acetone (4 column volumes). The eluate was absorbed into a column of Amberlite IRA-68 anion-exchange resin in the acetate form and washed with chilled demineralised water (2 column volumes). The column was then eluted with 0.1 M potassium acetate and the elute treated with acetone (5.75 volumes). The resulting precipitate was separated and dried in air at 35° to yield the *title compound* (68%, 68% pure), with physical characteristics similar to those of an authentic sample.

EXAMPLE 2

Preparation of (6R, 7R)-7-(D-5-amino-5-carboxypentanamido)-3-hydroxymethylceph -3-em-4-carboxylic acid Broth was collected aseptically from a cephalosporin C fermentation. 4 liters of the whole broth were transferred to a sterile 5 liter fermenter. The pH of the broth was adjusted to 5.0 with 5N phosphoric acid and the broth was stirred at 800 rev/min. Sterile air was piped to the fermenter at a rate of 3 liters/min. A 50% w/v glucose solution was fed at 7.0 ml/hour to prevent autolysis of the Cephalosporium organism. The pH was maintained in the range 5.0 to 5.5 by adding 5N phosphoric acid as required.

The culture was inoculated with 400 ml of Rhodotorula rubra broth which was prepared by growing the organism at 25° for 36 hours on a growth medium containing 2.2% w/v glucose, 0.25% w/v nitrogen as corn steep liquor, 0.5% w/v potassium dihydrogen phosphate and 0.1% w/v of a 1 : 1 mixture of polypropylene glycol and white mineral oil (pH adjusted to 5.8 presterilisation). After sterilisation a solution of potassium (6R,7R)-3-acetoxymethyl-7-(D-5-amino-5-carboxypentanamido)ceph-3-em-4-carboxylate was added to the growth medium to give a concentration of 0.1% w/v.

Samples of the mixed culture were removed for assay. The broth was centrifuged at 3000 rev/min. for 15 min. and the supernatants analysed by thin layer chromatography. After 12 hours, no cephalosporin C remained in the sample and a new compound identified as (6R,7R)-7-(D-5-amino -5-carboxypentanamido)-3-hydroxymethylceph-3-em-4-carboxylic acid had been produced. The concentration of this compound was 6.2 mg/ml.

4 liters of the mixed culture were subsequently filtered through a bed of filter-air after adjusting the pH to 4.5 and (6R,7R)-7-(D-5-amino-5-carboxypentanamido)-3-hydroxymethylceph-3-em-4-carboxylic acid was separated from the filtrate in a similar manner to Example 1. The product was dried in air at 35°C to yield 17.1 g of the *title compound* with a purity of 76.8% expressed as the free acid.

EXAMPLE 3

Preparation of (6R,7R)-3-hydroxymethyl-7-(thien-2-ylacetamido) ceph-3-em-4-carboxylic acid (6R,7R)-3-Acetoxymethyl-7-(thien-2-ylacetamido)ceph-3 -em-4-carboxylic acid (210g- 97.7% as Na salt) was dissolved in demineralised water (2liters) and sterilised by passing through a sterile asbestos filter. This was added to 4 liters of 0.5M phosphate buffer (pH 6.0), which had been autoclaved in a 10 liter bottle at 1400 kg/m² for 30 min. The buffered solution of (6R,7R)-3-acetoxymethyl-7-(thien-2-ylacetamido) ceph-3-em-4-carboxylic acid was inoculated with 2 liters of a culture of *Rhodotorula rubra* grown for 3 days at 25° on a rotary shaker in the presence of 1% w/v of (6R,7R)-3-acetoxymethyl-7-(thien-2ylacetamido)ceph-3-em-4-carboxylic acid.

The culture was aerated at 3 liters per minute and agitated using a magnetic stirrer. The ambient temperature was 25° and the pH of the culture was between 6.0 – 6.4 throughout. Samples were removed at intervals for thin layer chromatography assay against standard solutions of (6R,7R)-3-acetoxymethyl-7-(thien-2-ylacetamido)ceph-3-em-4-carboxylic acid and the title compound. Complete conversion was achieved after 67 hours. The final potency was ~25,000 μg/ml and volume 6630 ml.

The preferred systems for assay of the starting and end compounds were as follows:

Pre-coated cellulose plates (MN300, Camlab Cambridge) were dipped in 0.1M acetate buffer (pH 5.0) and dried slowly. The solvent systen was prepared by shaking 8 volts, ethyl acetate, 1 vol. n-butanol and 8 vols. acetate buffer for 2 hours. The aqueous phase was discarded and the organic phase was used to irrigate plates. 1 μl of suitably diluted sample was spotted at the origin and 1 μl of standard solutions containing 5000 μg/l used for comparison. The plates were developed in about 45 min, dried and irradiated with u.v. light for 10 min. ($\lambda_{max}$ 253 nm) and the separated cephalosporins quantified densitometrically.

The non-polar nature of the thienylacetamido grouping at position 7 allows the 3-hydroxmethyl compound to be solvent extracted, for example as follows:

To the 6,630 ml of broth, formalin (130 ml) was added to kill the yeast. After standing, the supernatant was decanted and extracted in 1000 ml batches as follows: The pH of the solution was adjusted to 2.2–2.5 and 2 liters of butyl acetate were added. The aqueous phase was re-extracted with butyl acetate (200 ml). The butyl acetate fractions were combined (2000 ml) and a 12.5% potassium acetate solution in industrial methylated spirit was added dropwise until there was no further precipitation. The product was filtered and washed with acetone. The efficiency of extraction from broth to potassium salt was >70% and the purity of product was high. The decomposition melting point of 194°–198° is the same as that published for authentic, pure title compound.

EXAMPLE 4

Preparation of (6R,7R)-3-hydroxymethyl-7-(thien-2-ylcetamido) ceph-3-em-4-carboxylic acid a. A *Rhodotorula rubra* suspension (1kg) prepared as described in Example 1 and preserved by freezing, was added to distilled water (10 liters) and, with stirring, sodium (6R,7R(-3-acetoxymethyl-7-thien-2-ylacetamido)-ceph-3-em-4-carboxylate (500 g), potassium dihydrogen orthophosphate (250 g) and disodium hydrogen orthophosphate (28.5 g) were also added. The mixture (pH 5.8) was stirred vigorously whilst a rapid stream of air was passed in. The progress of the reaction was followed by thin layer chromatography on silica gel plates developed in 0.5M sodium chloride solution and visualised with UV light. After 34 hours all the starting material has disappeared. The yeast was removed by centrifugation and retained, and the supernatant liquid clarified by filtration through a bed of kieselguhr.

The filtrate was acidified quickly to pH 2.1 with 10% orthophosphoric acid solution, whilst being stirred at room temperature and the precipitated solid was filtered off as rapidly as possible and washed thoroughly with distilled water until the washings were acid-free. The (6R,7R)-3-hydroxymethyl-7-(thien-2-ylactamido)ceph-3-em-4-carboxylic acid was dried in vacuo at 40° and amounted to 364 g (86% theory). It gave a clear solution in MeOH and 5% sodium bicarbonate solution and had $[\alpha]_D$ + 135° (c 1%, MeOH). Ultraviolet, infrared and pmr spectra were similar to those published for authentic title compound.

b. Re-use of *Rhodotorula rubra*

*Rhodotorula rubra*, recovered as in (a) above, was suspended in water (10 liters) and sodium (6R,7R)-3-acetoxymethyl-7-(thien-2-ylacetamido)ceph-3-em-4-carboxylate (500 g), potassium dihydrogen orthophosphate (250 g) and disodium hydrogen orthophosphate (28.5 g) were added and aeration and stirring carried out as in (a) above. TLC showed the reaction to be complete after 22 hours, whereafter the product was isolated as in (a) above, amounting to 367 g (86.5% theory). Solutions in methanol and sodium bicarbonate solution were clear; $[\alpha]_D$ = 136°. The UV, IR and pmr spectra were similar to those published for authentic title compound.

The yest was re-use a further 6 times to give a product of satisfactory quality in similar yields.

EXAMPLE 5

Preparation of (6R,7R)-7-[2-(fur-2yl)-2-methoxyiminoacetamido]-3-hydroxymethylceph-3-em-4-carboxylic acid (syn isomer)

Sodium (6R,7R)-3-acetoxymethyl-7-[2-(fur-2-yl)-2-methoxyiminoacetamido] ceph-3-em-4-carboxylate (syn isomer) (5.0 g, 11.0 mM) was dissolved in a stirred buffer solution containing potassium dihydrogen orthophosphate (1.23 g) and disodium hydrogen orthophosphate (0.144 g), in distilled water (100 ml). A frozen suspension of *Rhodotorula rubra* (10 g) was added and the mixture was mechanically stirred and continuously aerated at room temperature for 32 hours. Thin layer chromatography on silica with development in 0.5M sodium chloride and visualisation by ultra violet light demonstrated that hydrolysis was complete. The yeast cells were removed by centrifugation and the clear supernatant liquor was cooled to 2° and treated with 4-methylpentan-2-one (100 ml). Orthophosphoric acid (20% aqueous solution) was added to the stirred mixture until the pH was 2.0. Stirring was continued for three minutes and the product was then rapidly isolated by filtration, washed with 4-methylpentan-2-one (2 × 10 ml), bring (1 × 10 ml), water at 0° (2 × 10 ml) and dried at 40° in vacuo to give the *title compound* (3.25 g, 77.5% theory). The product was equilibrated in the atmosphere and had λ max (pH 6) 275 nm (ε 17,050); infra-red and p.m.r. spectra and elemental analysis agreed with the assigned structure; purity by high pressure liquid chromatography (HPLC) 98.2%.

EXAMPLE 6

Preparation of (6R,7R)-7-amino-3-hydroxymethylceph-3-em-4-carboxylic acid (6R,7R)-3-Acetoxymethy-7-aminoceph-3-em-4-carboxylic acid toluene-p-sulphonate dihydrate (5.0 g) was suspended in distilled water (100 ml) at room temperature. Ammonium hydroxide solution (S.G. 0.880) was added until complete solution was obtained (pH 7.6). The solution was treated with 10 g of a deep frozen suspension of Rhodotorula rubra. The suspension was stirred mechanically and continuously aerated for 30 hours at room temperature by which time hydrolysis was 95% complete (monitored on thin layer silica plates, development in 0.5M sodium chloride, vizualisation under ultra violet light).

The yeast cells were removed by centrifugation and the clear supernatant liquor, after decantation, cooled to 10°. The pH was adjusted to 3.6 with 20% orthophosphoric acid, and the product isolated by filtration, washed with water and dried at 40° in vacuo to give the title compound (1.23 g, 52.0% theory), $\lambda_{max}$ (pH 6) 264.5 nm ($\epsilon$ 7,000); purity by HPLC 94%. Infra-red pmr spectra agreed with the assigned structure.

EXAMPLE 7

Preparation of (6R, 7R, 2'R)-7-(2'-t-butoxycarbonylamino-2'-phenylacetamido)-3-hydroxymethylceph-3em-4-carboxylic acid.

A suspension of (6R, 7R, 2'R)-3-acetoxymethyl-7-(2'-t-butoxycarbonylamino-2'-phenylacetamido)ceph-3-em-4-carboxylic acid (14.67g) in water (100ml) was taken to pH 6 with 2N sodium hydroxide. The resulting solution was diluted with 0.4M pH 6 phosphate buffer (100ml) and a frozen paste of whole cells obtained from culture of Rhodotorula rubra (60g) was added. The suspension was stirred vigorously, with air bubbling through the mixture, for 28 hours. The mixture was centrifuged and the supernatant solution decanted and treated with sodium chloride (35g). The solution (containing some genatinous material) was clarified with kieselguhr. The filtrate was treated with ethyl acetate (500ml) and cooled to 5°, then taken to pH 2 with 25% phosphoric acid, with vigorous stirring. The resulting emulsion was filtered through a sintered-glass funnel and the organic phase separated and washed with brine and dried. The kieselguhr obtained above was washed with water (200ml) and the filtrate saturated with sodium chloride and taken to pH 2, under ethyl acetate as described above. The organic phase was separated and washed with brine and dried. The combined ethyl acetate solutions were concentrated in vacuo to ca. 80ml, and the solution left to crystallise. Filtration gave the title acid (5.93g) as fine needles, m.p. 180° to 188° (decomp.); $[\alpha]_D^{20}$ +19.1° (c 1.1, dioxan); $\lambda_{max}$ (pH 6 phosphate buffer) 259nm ($\epsilon$7,200).

EXAMPLE 8

Preparation of (6R, 7R, 2'R)-3-hydroxymethyl-7-(2'-hydroxy-2'-phenylacetamido)ceph-3-em-4-carboxylic acid.

A suspension of (6R, 7R, 2'R)-3-acetoxymethyl-7-(2'-hydroxy-2'-phenylacetamido)ceph-3-em-4-carboxylic acid, ethanol solvate (2g) in water (30 ml) was taken to pH 6 with 2N sodium hydroxide and the resulting solution treated with 0.4 M pH 6 phosphate buffer (30 ml) and a frozen paste of whole cells obtained from culture of Rhodotorula rubra (10g). The suspension was stirred vigorously in a beaker for 16 hours. The mixture was centrifuged and the supernatant decanted and saturated with sodium chloride. The solution was clarified with kieselguhr and the filtrate treated with ethyl acetate; it was then cooled to 5° and taken to pH 2 with 25% phosphoric acid, with vigorous stirring. The organic phase was separated and washed with brine, and dried and evaporated to a small volume in vacuo. The mixture was filtered to give the title acid (1.05g) as small plates, m.p. 225° to 230° (decomp); $[\alpha]_D^{20}$ +98° (c 1.1, 0.1M NaHCO₃); $\lambda_{max}$ (pH 6 phosphate buffer) 260nm ($\epsilon$8,200).

EXAMPLE 9

Preparation of (6R, 7R)-7-[2-(fur-2-yl)-2-methoxyimino acetamido]-3-hydroxymethylceph-3-em-4-carboxylic acid (syn isomer).

a. A suspension of (6R, 7R)-3-crotonoyloxymethyl-7-[2-(fur-2-yl)-2-methoxyiminoacetamido]ceph-3-em-4-carboxylic acid (syn isomer) (101 mg) in water (3ml) was taken to pH 6.8 with saturated sodium bicarbonate. 0.4M pH 6 phosphate buffer (3ml) and a frozen paste of whole cells obtained from culture of Rhodotorula rubra (1g) were added. The suspension was stirred vigorously in an open vessel for 17 hours at ca 20°, then centrifuged. The supernatant liquid was decanted and clarified with kieselguhr, and freeze-dried to give an amorphous solid. This material had chromatographic behavior (Rf 0.17 on Merck silica plates with chloroform:methanol:acetic acid = 90:16:5) and p.m.r. spectrum (in D₂O) similar to those of the compound prepared from the 3-acetoxymethyl derivative in Example 5.

b. A suspension of (6R, 7R)-3-benzoyloxymethyl-7-[2-(fur-2-yl)-2-methoxyiminoacetamido]ceph-3-em-4-carboxylic acid (syn isomer) (208mg) in water (3ml) was taken to pH 6.5 with saturated sodium bicarbonate. 0.4M pH 6 phosphate buffer (3ml) and a frozen paste of whole cells obtained from culture of Rhodotorula rubra (1g) were added and the mixture was treated as described in (a) above. The final product, after freeze-drying, had an Rf value and p.m.r. spectrum (D₂O) similar to those of authentic material.

EXAMPLE 10

Deacetylation of (6R,7R)-3-acetoxymethyl-7-formamidoceph-3-em-4-carboxylic acid A suspension of (6R, 7R)-3-acetoxymethyl-7-formamidoceph-3-em-4-carboxylic acid (12.0 g) in water (150 ml) was taken to pH 6 with 1M sodium hydroxide. The resulting solution was diluted with 0.4 M pH 6 phosphate buffer (90 ml), and a frozen paste of whole cells obtained from culture of Rhodotorula rubra (61.5g) was added. The suspension was stirred vigorously for 19 hours. After centrifuging the mixture, decanting the supernatant liquid and clarifying the solution with kieselguhr the product was characterised by reaction with diphenyldiazomethane, which yielded diphenylmethyl (6R, 7R)-7-formamido-3-hydroxymethylceph-3-em-4-carboxylate (8.44g) as fine needles m.p. 158° (decomp); $[\alpha]_D^{22}$ +16.2° (c 1.1, acetone); $\lambda_{max}$ (ethanol) 258 nm. ($\epsilon$7,300). Infra-red and p.m.r. spectra and elemental analysis agreed with the assigned structure.

EXAMPLE 11

Deacetylation of (6R,7R)-3-acetoxymethyl-7-(D-5-benzoylamino-5-carboxypentanamido)ceph-3-em-4-carboxylic acid (6R,7R)-3-Acetoxymethyl-7-(D-5-benzoylamino-5-carboxypentanamido)ceph-3-em-4-carboxylic acid (1g) was dissolved in 0.1 M pH 6.0 phosphate buffer (100 ml). 10 ml portions of this solution were added to each of ten 100 ml glass conical flasks.

Cells of Rhodotorula rubra grown on a nutrient medium as described in Example 1 were washed in 0.1 M phosphate buffer by centrifugation and resuspended in an equal volume of the same buffer. 2.0 ml portions of this suspension were then added to each of the ten flasks containing (6R,7R)-3-acetoxymethyl-7-(D-5-benzoylamino-5-carboxypentanamido) ceph-3-em-4-carboxylic acid. The flasks were then incubated at 25° on a rotary shaker having a 5 cm throw and operating at 245 rev/min. Samples were analysed by thin layer chromatography on cellulose coated plates using a solvent system comprising 70% v/v aqueous n-propanol. A sample of the starting material was chromatographed as a marker. The starting compound had an $R_f$ value of 0.69 and this disappeared during the incubation. After 72 hours incubation there was no detectable (6R,7R)-3-acetoxymethyl-7-(D-5-benzoylamino-5-carboxypentanamido) ceph-3-em-4-carboxylic acid, and a new compound having an $R_f$ value of 0.59 was observed. This compound was characterised by reaction with diphenyldiazomethane, which yielded diphenylmethyl (6R,7R)-7-(D-5-benzoylamino-5-diphenylmethoxycarbonylpentanamido)-3-hydroxymethylceph-3-em-4-carboxylate (0.70 g) identical (by infra-red spectroscopy) with an authentic sample.

EXAMPLE 12

Preparation of (6R,7R)-7-(D-5-amino-5-carboxypentanamido)-3-hydroxymethylceph-3-em-4-carboxylic acid The process of Example 2 was repeated except that a broth of Rhodotorula graminis CBS 2826 was employed in place of the Rhodotorula rubra broth. The procedure for growth of the Rhodotorula graminis was the same as that described in Example 2 for Rhodotorula rubra.

Chromatographic analysis (thin layer chromatography as in Example 2) showed that deacetylation was completed within 18 hours and the concentration of (6-R,7R)-7-(D-5-amino-5-carboxypentanamido)-3-hydroxymethylceph-3-em-4-carboxylic acid was 6.45 mg/ml. The broth (4 liters) was extracted as described in Example 1 to yield the *title compound* (16.5 g) with a purity of 73.3% expressed as the free acid.

EXAMPLE 13

Preparation of (6R,7R)-7-(D-5-amino-5-carboxypentanamido)-3-hydroxymethylceph-3-em-4-carboxylic acid using various species of the genus Rhodotorula Samples of each organism used were sub-cultured into agar slopes of yeast extract/peptone growth medium and incubated at 25° until the surface was covered. Primary liquid cultures inoculated from the slope were shake-cultured for 48 hours and then used to inoculate secondary liquid cultures of the same medium with 0.1% w/v (6R,7R)-3-acetoxymethyl-7-(D-5-amino-5-carboxypentanamido)ceph-3-em-4-carboxylic acid added to induce enzyme activity. After 72 hours incubation the secondary cultures were used to deacetylate (6R,7R)-3-acetoxymethyl-7-(D-5-amino-5-carboxypentanamido)-ceph-3-em-4-carboxylic acid.

Samples comprising 0.1 M pH 6.0 phosphate buffer (8.5 ml) and (6R,7R)-3-acetoxymethyl-7-(D-5-amino-5-carboxypentanamido)ceph-3-em-4-carboxylic acid (1.0 ml of a 10% w/v aqueous solution) were incubated with 0.5 ml portions of yeast broths prepared as described above. Each sample was assayed by thin layer chromatography on cellulose plates using a solvent system comprising 70% v/v aqueous n-propanol, reference standards of (6R,7R)-3-acetoxymethyl-7-(D-5-amino-5-carboxypentanamido)ceph-3-em-4-carboxylic acid and (6R,7R)-7-(D-5-amino-5-carboxypentanamido)-3-hydroxymethylceph-3-em-4-carboxylic acid being run on each plate.

The results of assays for (6R,7R)-3-acetoxymethyl-7-(D-5-amino-5-carboxypentanamido)ceph-3-em-4-carboxylic acid (Ceph. C) and (6R,7R)-7-(D-5-amino-5-carboxypentanamido)-3-hydroxymethylceph-3-em-4-carboxylic acid (DAC) after incubation for 24 hours and 72 hours respectively are as follows:

| Rhodotorula species | Strain | Concentration of Ceph. C and DAC ($\mu$g/ml) | | | |
|---|---|---|---|---|---|
| | | After 24 hours | | After 72 hours | |
| | | Ceph. C | DAC | Ceph. C | DAC |
| R. rubra | CBS 17 | 530 | 6960 | — | 6180 |
| R. aurantiaca | CBS 317 | 6820 | 1130 | 3900 | 2100 |
| R. glutinis var. dairenensis | CBS 4406 | 796 | 6100 | — | 6840 |
| R. glutinis | CBS 20 | — | 7300 | — | 7060 |
| R. lactosa | CBS 5826 | 6730 | 1130 | 5320 | 1740 |
| R. marina | CBS 2365 | 7000 | 1130 | 612 | 4580 |
| R. minuta | CBS 319 | 5460 | 1590 | 4360 | 2700 |
| R. pallida | CBS 320 | 6320 | 1130 | 4260 | 2320 |
| R. pilimanae | CBS 5804 | 4700 | 2720 | 1750 | 4520 |
| Control - no yeast | — | 6820 | 976 | 5120 | 1280 |

EXAMPLE 14

Preparation of (6R,7R)-7-(4-carboxybutanamido)-3-hydroxymethylceph-3-em-4-carboxylic acid Samples of (6R,7R)-3-acetoxymethyl-7-(4-carboxybutanamido)ceph-3-em-4-carboxylic acid (14 mg) in water (3.5 ml) were mixed with 1 M pH 6.0 phosphate buffer (0.5 ml) and water (0.5 ml) and inoculated with 0.5 ml of Rhodotorula rubra broth. Control samples containing no yeast broth were also set up.

After overnight incuation at 25° on a rotary shaker, the samples were analysed by thin layer chromatography on cellulose plates. The solvent system was 70% v/v aqueous n-propanol and zones were detected using a densitometer. In samples to which the yeast broth was added the starting material ($R_f$ 0.62) had disappeared and was replaced with a new compound having an $R_f$ value of 0.47. Treatment with dilute acid has no effect on control samples but with yeast treated samples the product was converted to a compound having an increased mobility ($R_f = 0.50$) on the chromatography plate. This behaviour is consistent with the product of the yeast treatment being the title compound.

The product was also identical to the product obtained by -carboxypentanamido)-of (6R,7R)-7-(D-5-amino-5carboxypentanamido)-3-hydroxymethylceph-3-em-4-carboxylic acid with D-amino acid oxidase from *Trigonopsis variabilis* in the presence of sodium azide.

EXAMPLE 15

Preparation of (6R,7R)-7-(D-5-amino-5-carboxypentanamido)-3-hydroxymethylceph-3-em-4-carboxylic acid using *Rhodotorula rubra* cells entrapped in polyacrylamide gel.

A culture of *Rhodotorula rubra* was prepared as described in Example 1. 10 ml of broth was washed by centrifugation and resuspended in an equal volume of 0.1 M pH 6.0 phosphate buffer. This suspension was mixed with 40% w/v acrylamide monomer in buffer (10 ml), 2.3% w/v N,N-methylenebisacrylamide in buffer (6 ml), ammonium persulphate (0.0375 g), N,N,N,N,-tetramethylethylenediamine (0.048 ml) and 0.1 M pH 6 phosphate buffer (34 ml). Nitrogen was bubbled through the suspension which was then placed in an ice-bath until polymerisation was complete. A portion of the resulting gel was extruded through a sieve (20 mesh) to produce a small particle size. The sieved gel was washed extensively with buffer until there were no yeast cells in the washings.

4.0 ml portions of the gel suspension were each mixed with 0.1 M pH 6 phosphate buffer (5.0 ml) in glass flasks and inoculated with 10% w/v (6R,7R)-3-acetoxymethyl-7-(D-5-amino-5-carboxypentanamido)ceph-3-em-4-carboxylic acid (1.0 ml). After incubation for 42 hours at 25° on a rotary shaker it was shown by thin layer chromatography analysis that the concentration of (6R,7R)-7-(D-5-amino-5-carboxypentanamido)-3-hydroxymethylceph-3-em-4-carboxylic acid was 5.86 mg/ml whilst the (6R,-7R)-3-acetoxymethyl-7-(D-5-amino-5-carboxypentanamido)ceph-3-em-4-carboxylic acid concentration had fallen to 0.78 mg/ml. Controls with polyacrylamide gel having no yeast cells entrapped had (6R,7R)-7-(D-5-amino-5-carboxypentanamido)-3-hydroxymethylceph-3-em-4-carboxylic acid concentrations of only 1.2 mg/ml and residual (6R,7R)-3-acetoxymethyl-7-(D-5-amino-5-carboxypentanamido)ceph-3-em-4-carboxylic acid concentrations of 5.48 mg/ml.

EXAMPLE 16

Preparation of (6R,7R)-7-(D-5-amino-5-carboxypentanamido)-3-hydroxymethylceph-3-em-4-carboxylic acid using *Rhodotorula rubra* cells entrapped in cellulose triacetate fibres

*Rhodotrula rubra* was shake-cultured at 25° for 72 hours in the presence of 0.1% w/v (6R,7R)-3-acetoxymethyl-7-(D-5-amino-5-carboxypentanamido)ceph-3-em-4-carboxylic acid. The cells from 40 ml of the whole broth were harvested, washed by centrifugation and resuspended in water (7 ml). An emulsion was prepared from this suspension by adding 2 ml of the suspension to 10 ml of a 5% w/v solution of cellulose triacetate in methylene chloride and rapidly stirring the mixture for 2 minutes using a mechanical stirrer. The resulting emulsion was extruded from a stainless steel hypodermic needle (Everett Star, size 0) into the vortex formed by rapidly stirring toluene using a magnetic stirrer. A continuous thread was drawn out and collected around the stirrer. The thread was recovered, washed in water and stored in water at 4°. The total weight of damp dry fibre recovered was 1.5 g.

0.4 g samples of the fibre were pressed dry on filter paper and then placed in a mixture of 0.1M pH6 phosphate buffer (9 ml) and 10% w/v (6R,7R)-3-acetoxymethyl-7-(D-5-amino-5-carboxypentanamido)ceph-3-em-4-carboxylic acid (1.0 ml). After incubation on a rotary shaker at 25°, samples were withdrawn for chromatographic assay. It was shown that (6R,7R)-7-(D-5-amino-5-carboxypentanamido)-3-hydroxymethylceph-3-em-4-carboxylic acid was produced at the rate of 2.75 mg/g fibre/hour.

The fibre was recovered from the incubation system and washed in water. The same fibre was then re-used to deacylate (6R,7R)-3-acetoxymethyl-7-(D-5-amino-5-carboxypentanamido)ceph-3-em-4-carboxylic acid. A rate of production of (6R,7R)-7-(D-5-amino-5-carboxypentanamodo)-3-hydroxymethylceph-3-em-4-carboxylic acid of 4.15 mg/g fibre/hour was obtained with the re-used fibre.

We claim:

1. In a process for the enzymically catalysed hydrolysis of a 3-acyloxymethylceph-3-em-4-carboxylic acid to a 3-hydroxy-methyl analogue thereof the improvement which consists of contacting said 3-acyloxymethylceph-3-em-4-carboxylic acid with an esterase produced by culturing a yeast microorganism or a mutant thereof of the genus Rhodotorula.

2. The process of claim 1 wherein said esterase is produced by culturing a yeast microorganism of the species *Rhodotorula rubra*.

3. The process of claim 2 wherein the microorganism is *Rhodotorula rubra* CBS 6469.

4. The process of claim 2 wherein the microorganism is *Rhodotorula rubra* CBS 17.

5. The process of claim 1 wherein the microorganism is *Rhodotorula glutinis* CBS 20.

6. The process of claim 1 wherein the microorganism is *Rhodotorula glutinis var. diarenensis* CBS 4406.

7. The process of claim 1 wherein the microorganism is *Rhodotorula graminis* CBS 2826.

8. The process of claim 1 wherein the 3-acyloxymethylceph-3-em-4-carboxylic acid is contacted with a source of esterese comprising whole cells obtained from a cultured broth of the yeast microorganism.

9. The process of claim 1 wherein the 3-acyloxymethylceph-3-em-4-carboxylic acid is contacted with a source of esterase comprising a cultured broth of the yeast microorganism.

10. The process of claim 1 wherein the 3-acyloxymethylceph-3-em-4-carboxylic acid is a compound of general formula

17

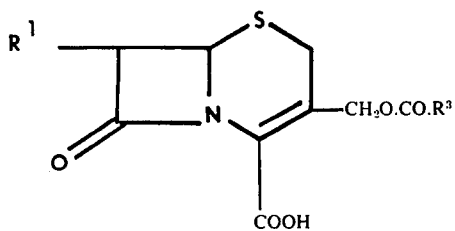

wherein $R^1$ is selected from amino; D-5-amino-5-carboxypentamido; D-5benzoylamino-5-carboxypentanamido; 4-carboxybutanamido; formamido; the group of formula

R.CH$_2$.CONH— where R is phenyl, thienyl or furyl; the group of formula

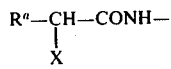
R$^a$—CH—CONH—
|
X where $R^a$ is phenyl or naphthyl and X is amino, t-butoxycarbonylamino or hydroxy; and the group of formula

18

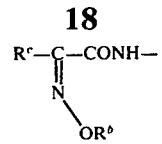

where $R^b$ is $C_{1-6}$ alkyl, $C_{5-7}$ cycloalkyl or phenyl and $R^c$ is phenyl, naphthyl furyl, thienyl or pyridyl; and $R^3$.CO— is selected from acetyl, crotonoyl and benzoyl.

11. A process for the preparation of (6R,7R)-7-(D-5-amino-5-carboxypentanamido)-3-hydroxymethylceph-3-em-4-carboxylic acid which comprises contacting (6-R,7R)-3-acetoxymethyl-7-(D-5-amino-5-carboxypentanamido)ceph-3-em-4-carboxylic acid with an esterase produced by culturing a yeast microorganism of a mutant thereof of the genus Rhodotorula to effect enzymically catalysed hydrolysis thereof.

12. The process of claim 11 which comprises contacting a whole broth from a cephalosporin C fermentation with the esterase.

13. A process for the preparation of (6R,7R)-7-[2-(fur-2yl)-2-methoxyiminoacetamido]-3-hydroxymethylceph-3-em-4-carboxylic acid (syn isomer) which comprises contacting (6R,7R)-3-acetoxymethyl-7-[2-(fur-2-yl)-2-methoxyiminoacetamido]ceph-3-em-4carboxylic acid with an esterase produced by culturing a yeast microorganism or a mutant thereof of the genus Rhodotorula to effect enzymically catalysed hydrolysis thereof.

* * * * *

UNITED STATES PATENT OFFICE
CERTIFICATE OF CORRECTION

Patent No. 3,912,589                    Dated October 14, 1975

Inventor(s) SMITH, Alan    &    GOULDEN, Stephen Arthur

It is certified that error appears in the above-identified patent and that said Letters Patent are hereby corrected as shown below:

On the Cover Sheet, the following should be inserted:

--[30] Foreign Application Priority Data

May 14, 1973              United Kingdom              22799/73--

Signed and Sealed this

Third Day of August 1976

[SEAL]

Attest:

RUTH C. MASON
*Attesting Officer*

C. MARSHALL DANN
*Commissioner of Patents and Trademarks*